United States Patent
Lourman et al.

(10) Patent No.: US 8,489,226 B2
(45) Date of Patent: Jul. 16, 2013

(54) METHOD FOR AUTOMATICALLY AND SEQUENTIALLY LOADING OBJECTS AND CORRESPONDING EQUIPMENT

(75) Inventors: Didier Lourman, Lafresguimont Saint Martin (FR); Didier Heckmann, Salon de Provence (FR)

(73) Assignee: Saverglass S.A.S., Feuquieres (FR)

( * ) Notice: Subject to any disclaimer, the term of this patent is extended or adjusted under 35 U.S.C. 154(b) by 1282 days.

(21) Appl. No.: 12/090,092

(22) PCT Filed: Oct. 11, 2006

(86) PCT No.: PCT/FR2006/002290
§ 371 (c)(1),
(2), (4) Date: Apr. 13, 2008

(87) PCT Pub. No.: WO2007/042673
PCT Pub. Date: Apr. 19, 2007

(65) Prior Publication Data
US 2008/0247858 A1   Oct. 9, 2008

(30) Foreign Application Priority Data
Oct. 13, 2005   (FR) .................................... 05 10671

(51) Int. Cl.
*B65G 65/00* (2006.01)
(52) U.S. Cl.
USPC ........... 700/213; 414/730; 414/806; 414/779; 414/816
(58) Field of Classification Search
USPC .......... 700/213, 218, 227, 229, 230; 198/376, 198/377.06, 377.01, 395, 400, 401
See application file for complete search history.

(56) References Cited

U.S. PATENT DOCUMENTS

| | | | |
|---|---|---|---|
| 3,363,546 A | 1/1968 | Johnson | |
| 4,280,612 A * | 7/1981 | Nagano | 198/379 |
| 5,212,647 A * | 5/1993 | Raney et al. | 700/192 |
| 5,317,967 A * | 6/1994 | Heidenreich | 101/38.1 |
| 6,223,653 B1 * | 5/2001 | Christ | 101/38.1 |
| 6,508,498 B1 * | 1/2003 | Spether | 294/116 |
| 6,510,365 B1 * | 1/2003 | Nishinakayama et al. | 700/214 |
| 6,758,907 B2 * | 7/2004 | Kampmann | 118/503 |
| 6,918,485 B2 * | 7/2005 | Holston et al. | 198/417 |
| 7,097,029 B2 * | 8/2006 | Halang | 198/779 |
| 7,244,093 B2 * | 7/2007 | Watanabe et al. | 414/806 |
| 7,331,152 B2 * | 2/2008 | Menke | 53/67 |
| 2004/0037689 A1 * | 2/2004 | Watanabe et al. | 414/730 |
| 2005/0122606 A1 * | 6/2005 | Kamatani | 360/17 |
| 2005/0145331 A1 * | 7/2005 | Dewig et al. | 156/277 |
| 2006/0151296 A1 * | 7/2006 | Halang | 198/779 |

FOREIGN PATENT DOCUMENTS

WO   WO 2007093400 A1 *  8/2007

* cited by examiner

*Primary Examiner* — Gene Crawford
*Assistant Examiner* — Kyle Logan
(74) *Attorney, Agent, or Firm* — Bachman & LaPointe, P.C.

(57) ABSTRACT

A method is provided for automatically and sequentially loading objects onto a feed system, each having a respective axis of rotation and respective first and second indices of rotation about the respective axes. The loading of each object onto the feed system causes an orientation in a predetermined relative position. The method consists in particular in selectively operating a relative rotation of the object and of the handling device about their axis of rotation to achieve the orientation.

18 Claims, 2 Drawing Sheets

METHOD FOR AUTOMATICALLY AND SEQUENTIALLY LOADING OBJECTS AND CORRESPONDING EQUIPMENT

BACKGROUND

1. Field of Invention

The present invention relates, in general, to the field of methods, and associated equipment, for automatic and sequential loading of objects, particularly for the purpose of placing a decoration on each object.

More precisely, the invention relates to a method for automatic and sequential loading of objects of a predetermined type onto a holding device, where each object and the holding device having first and second respective axes of rotation and first and second respective locators of rotation about these respective axes. The loading of each object onto the holding device leads to a contact of the object with the device, to an alignment of the first and second axes, and to an angular setting of the first and second locators in a predetermined relative angular position. The method comprises the steps of carrying out a movement of each object until it is in contact with the holding device and selectively carrying out a relative rotation of the object and of the holding device about the first and second axes of rotation to achieve said setting position.

2. Prior Art

When a user desires to decorate a packaging object made of glass or organic material (flask, carafe, bottle or cosmetic pot for example), via a conventional method such as screen-printing or pad-printing, the user is faced with the problem of setting the decoration to be placed with, on the one hand, the geometric particular features of the object and, on the other hand, decorations or decoration roughs that may already exist, knowing that the objects have a random angular position.

As examples:
- the placement of the decoration must be situated on a clearly defined zone of the object, such as a flat, or must be positioned relative to a mechanical locator situated on the object (locating notch or pins) or else on a preexisting decoration element such as, a reserve element (transparent window) in a satin finishing or a lacquering;
- the decoration must be made on a zone in which the object has no defect, for example the join mark of molds called a "mold joint" on glass articles.

In current machines (items of equipment), the setting is essentially mechanical, carried out by making a part of the decorating machine, called the skirt, fixedly attached to the object to be decorated.

The angular setting is carried out by a retractable pin, mounted on a spring, fixedly attached to the skirt, which sets itself in a notch made on the bottom of the object or by another blocking device on a notch positioned on the body of the object. Once the object is immobilized relative to the skirt, the latter is placed in rotation to bring the object into the angular position suitable for the placement. Alternatively, there are implementations in which the skirt is fixed and the object is placed in rotation.

Mechanical setting has the following disadvantages.

When the skirt and the object are placed in relative rotation, the friction between the movable elements (skirt and pin) and the fixed elements (bottom of the object) leads on the one hand to a deterioration of the appearance of the bottom in the case of objects coated with a varnish, a lacquer or a chemical satin finish. It also leads to wear of the skirt and/or the pin, which may occur after several hours of operation, which causes a loss of quality of angular location, and even a breakage of the object, which leads to the cost of machine stoppage and of replacement parts.

These elements may also lead to limiting the speed of rotation of the skirt and hence to reducing the overall rate of production. Furthermore, this type of method leads to a limited precision, because of the mechanical tolerances of the object, of the pin and of the notch, these tolerances being able to lead, by accumulation, to nonconformities.

SUMMARY OF THE INVENTION

The object of the present invention is to make the setting more precise, less aggressive and/or more rapid.

For this purpose, the method according to the invention, furthermore conforming to the generic definition given above, is essentially characterized in that it comprises a preparation step, applied for each object being loaded, and prior to its contact with the holding device.

This preparation step comprises a location operation consisting in generating an output signal representative of the relative angular position between the object and the loading device, and an operation of angular correction consisting in carrying out a relative rotation according to said output signal in order to achieve the setting position.

Thanks to this step, the skirt and the pin may be placed directly at the appropriate angle when the object is presented to them. That is to say that the movement of each object comprises a movement of translation between the object and the holding device, to achieve the setting position, subsequent to the angular correction operation, which prevents friction due to the contact and the rotation and corresponding disadvantages.

The absence of rotation of the object or of the holding device (skirt) when they are in contact makes it possible to not wear the materials. Damage to the bottom of the object by friction is avoided. This makes it possible to place a decoration on objects, for example, made of glass or of plastic, coated with an organic material such as a lacquer or a varnish, or coated with a mineral coating such as an enamel, and to place decoration on objects made of glass given a satin finish by chemical means or by sanding.

Also avoided in this case is wear on the pins that may occur, as in the prior art, in a few hours.

In addition, the positioning sequence is therefore carried out much more quickly. The absence of mechanical friction means that the skirt, whose moment of inertia is low, may be very rapidly prepositioned facing the object so that the pin is placed in the notch with no mechanical force.

In one embodiment, it is therefore possible even to dispense with the docking pin.

In another embodiment, it is therefore also possible to dispense with the positioning notch.

In the preferred embodiment, the generation of the output signal is carried out by taking, by optical means, a picture of the object. Then, a processing of the picture obtained is carried out in order to locate a feature of the object or a decoration element having an optical signature. Based on the located feature, the angular position of the object relative to said optical means is computed.

In one embodiment, the relative rotation is carried out by rotating the holding device about its axis of rotation.

The absolute angular position of the holding device being known, likewise the position of its own locator (for example the pin), it is sufficient to know the relative angular position of the holding device and of the object to present the object in an appropriate position for the placement of at least one decoration element.

The method according to the invention therefore also comprises an operation of rotation, in a determined angular position, of the coupling consisting of the object and the holding device fixedly attached to one another, and an operation of placement of at least one decoration element on the object.

In another embodiment, the method according to the invention also comprises an operation of inspection, or of location of said placement, of a decoration element, already present on the article.

Thanks to this inspection operation, it is possible to make a decoration as a rework on a partially decorated object.

Preferably, the inspection operation comprises the step of taking, by optical means, a picture of the object, and carrying out a processing of the picture obtained to locate a feature of the decoration having an optical signature. Based on the located feature, the angular position of the decoration element relative to the object is then computed, and an output signal representative of the value of the angle thus computed is generated.

In another embodiment, it is possible to finely reset an object whose first decoration is not in the exact place while being within tolerances, making it possible to recover an acceptable position.

The invention also relates to an item of equipment for the automatic and sequential loading of objects of a predetermined type on a holding device.

In one embodiment, the item of equipment is capable of applying the method.

Each object and the holding device have respective first and second axes of rotation and respective first and second locators of rotation about these respective axes.

The loading of each object onto the holding device leads to a contact of the object with the device, to an alignment of the first and second axes, and to an angular setting of the first and second locators in a predetermined relative angular position.

The item of equipment comprises the holding device, means for moving each object and for ensuring it is in contact with the holding device, and means for selectively carrying out a relative rotation of the object and of the holding device about first and second axes of rotation and for achieving said setting position.

This item of equipment is characterized in that it also comprises locating means configured to generate an output signal representative of the relative angular position of the first and second locators, and angular correction means configured to carry out said relative rotation as a function of said output signal.

In one embodiment, the locating means are optical means.

Preferably, the optical means comprise at least one camera.

Finally, another advantage of the invention lies in that it may be used irrespective of the shape of the object (square, oval, cylindrical, etc.).

BRIEF DESCRIPTION OF THE DRAWINGS

Other features and advantages of the invention will clearly emerge from the description made thereof below, as an indication and in no way limiting, with reference to the drawings in which.

DETAILED DESCRIPTION OF THE PREFERRED EMBODIMENT(S)

Figure 1:
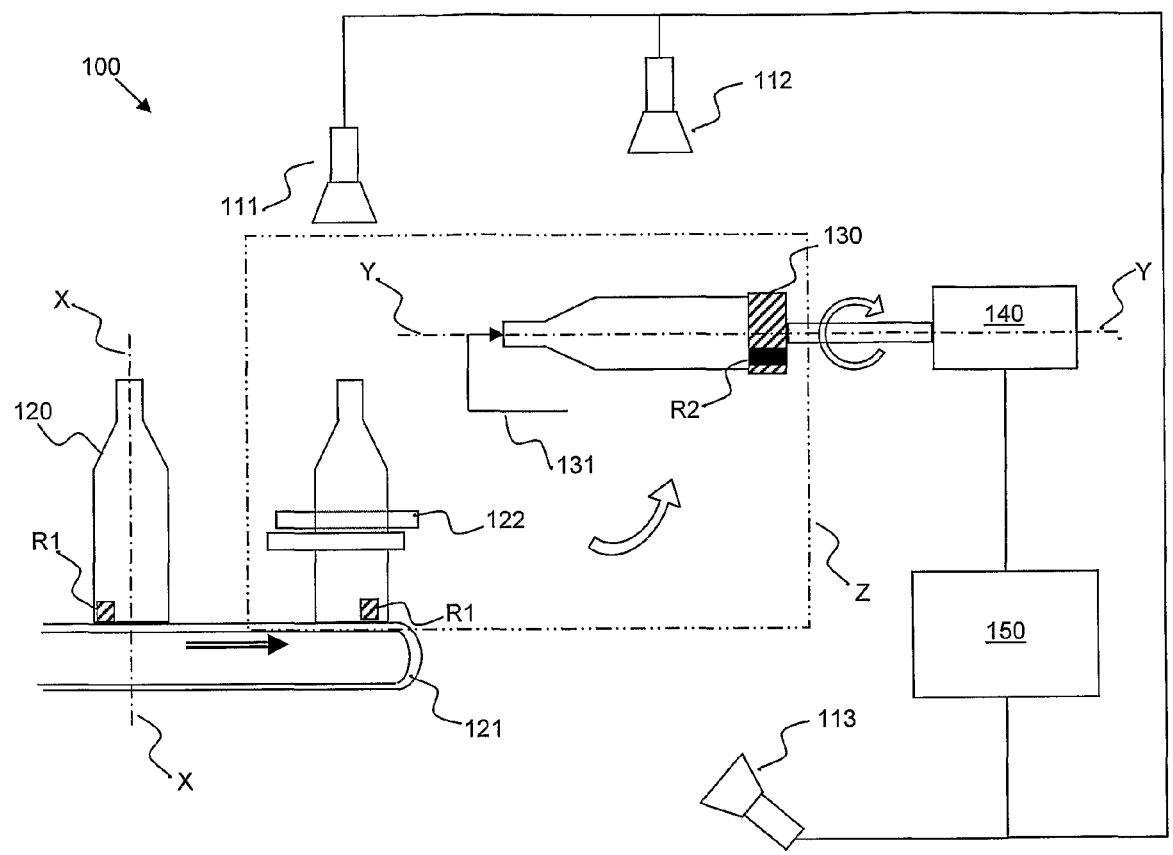
FIG. 1 is a schematic representation of an embodiment of the item of equipment according to the invention.

With reference to FIG. 1, the invention relates in particular to an item of equipment 100 for the automatic and sequential loading of objects 120 of a predetermined type onto a holding device 130. Preferably, the object is a bottle, a flask or a carafe. It may also be a cosmetic pot. Preferably, it is a glassware article.

A particular example of such an item of equipment is a rotary or linear multicolor screen-printing machine for a glassware article.

In one embodiment, the holding device comprises at least one skirt 130 and advantageously a tailstock center 131 (partially shown).

Each object 120 and the holding device 130 have respective first XX and second YY axes of rotation and respective first R1 and second R2 locators of rotation about these respective axes.

As schematically represented in FIG. 1, the loading of each object 120 onto the holding device 130 leads to a contact of the object with the device, to an alignment of the first and second axes, and to an angular setting of the first and second locators in a predetermined relative angular position.

The item of equipment in particular comprises said holding device. It also comprises means 121 for moving each object, such as a conveyor belt, and for ensuring that it makes contact with the holding device, for example an articulated movable arm (not shown), and means 140 for selectively carrying out a relative rotation of the object and of the holding device about the first and second axes of rotation and for achieving said setting position.

For example, the means 140 for selectively carrying out a relative rotation between the object 120 and the holding device 130 include a motor capable of placing the holding device 130 in rotation about its axis YY of rotation, in the clockwise and/or anticlockwise direction.

The setting operation is conventionally carried out at two stations: a loading station and a setting station.

On the loading station, the following operations are carried out, taking a bottle as an example of an object:
- the object is brought by a conveyor 121 to the holding zone Z where it may be centered on the belt of the equipment by two side guidance prongs 122. At this time, it is placed vertically,
- the object is then gripped by two pincers—not shown—and undergoes a 90° rotation in a vertical plane, which brings it to the horizontal,
- the object is then fixed between two elements which come to adjust, namely a skirt 130 motorized by a motor 140 which is fixed to the base of the object and a tailstock center 131 which presses on the neck. The object is immobilized in rotation, for example by a set of three rollers (not shown).

The skirt is a cylinder of which one end is recessed so as to receive the bottom of the object and hold it fixed in the skirt/tailstock center axis YY. It is furnished with a retractable pin designed to be positioned in a notch R1 on the bottom of the object. The pin may form the locator R2 of rotation of the holding device.

On the setting station, the following operations are usually carried out.

The skirt 130 (in contact with the object) is placed in rotation until the pin, under the action of a spring, positions itself in the notch, thereby fixedly attaching the skirt to the object according to a predefined locator.

The assembly formed by the object 120, the motorized skirt 130, and the tailstock center 131 is placed in rotation at a determined angle in order to position the object angularly, about the axis YY, before the decoration is placed, as described later. This operation usually takes place during the phase for transferring the object to a decoration station (screen-printing, pad-printing, inkjet, etc.).

This rotation of the assembly of the elements thus fixedly attached is a function of the decoration to be placed.

According to the invention, the item of equipment also comprises locating means 111, 113 configured to generate an output signal representative of the relative angular position of the first R1 and second R2 locators, and angular correction means configured to carry out said relative rotation as a function of said output signal. The angular correction means comprises, for example, a robot 150 which controls the rotation of the skirt 130 via a motor 140.

Preferably, the locating means 111, 113 are optical means. And more particularly, the optical means comprise at least one camera.

In a particular embodiment, the locating means 111 are situated just above the object when the latter is, on the conveyor, held by the pincers, just before the object undergoes the 90° rotation in a vertical plane which brings it to the horizontal.

Via one or more cameras, a picture of the object is then taken when the latter is still on the feed conveyor 121 of the item of equipment and, preferably, but not necessarily, when the latter is centered by centering prongs 122, at the moment of, or just after, if being seized by holding pincers (not shown) of the decorating machine. In a particular example, the seizing of the object by the seizing pincers triggers a picture-taking command signal.

Based on the picture and the geometric feature R1 located, the angular position of the object is then computed relative to the camera and is communicated to a robot 150 which commands the placing in rotation, by an electric motor 140, of the skirt 130 furnished with its pin R2 so that the docking and positioning of the pin is carried out by only one translation movement. Therefore, the invention makes it possible to remove the friction due to the contact and relative rotary movement between the skirt and the object.

Typically, for a bottle 120, the camera is placed vertically above the input conveyor 121 and just above the throat of the object. The camera therefore sees its bottom through the opening.

As an alternative to this simple method, it is also possible to envisage a lateral observation by a set of four to six cameras which reconstitute the outer wall of the object and determine the angular position of a locator, in particular the mold joint. It is again possible to observe the object via a camera 113 placed under the object, particularly when the objects are opaque.

In another embodiment, the item of equipment also comprises inspection means 112 configured to generate an output signal representative of the conformity of the setting of the object and/or of the positioning of a decoration element on the object. Typically, this second level of processing is carried out by locating means, preferably optical, similar or identical to the locating means 111, 113 defining the first level of processing.

When it is desired to carry out a finer setting or to inspect the position of a pattern (inspection of its presence, of its angular position or inspection of its height), a second camera 112 is placed above the object when the latter has been docked and positioned before screen-printing.

The user determines whether the position and/or the whole of a preexisting decoration—or pattern—conforms to the specifications. The same picture recognition algorithms as those described for the picture processing are used for this purpose.

The invention is advantageously applied in a decorating machine (item of equipment).

Figure 2:
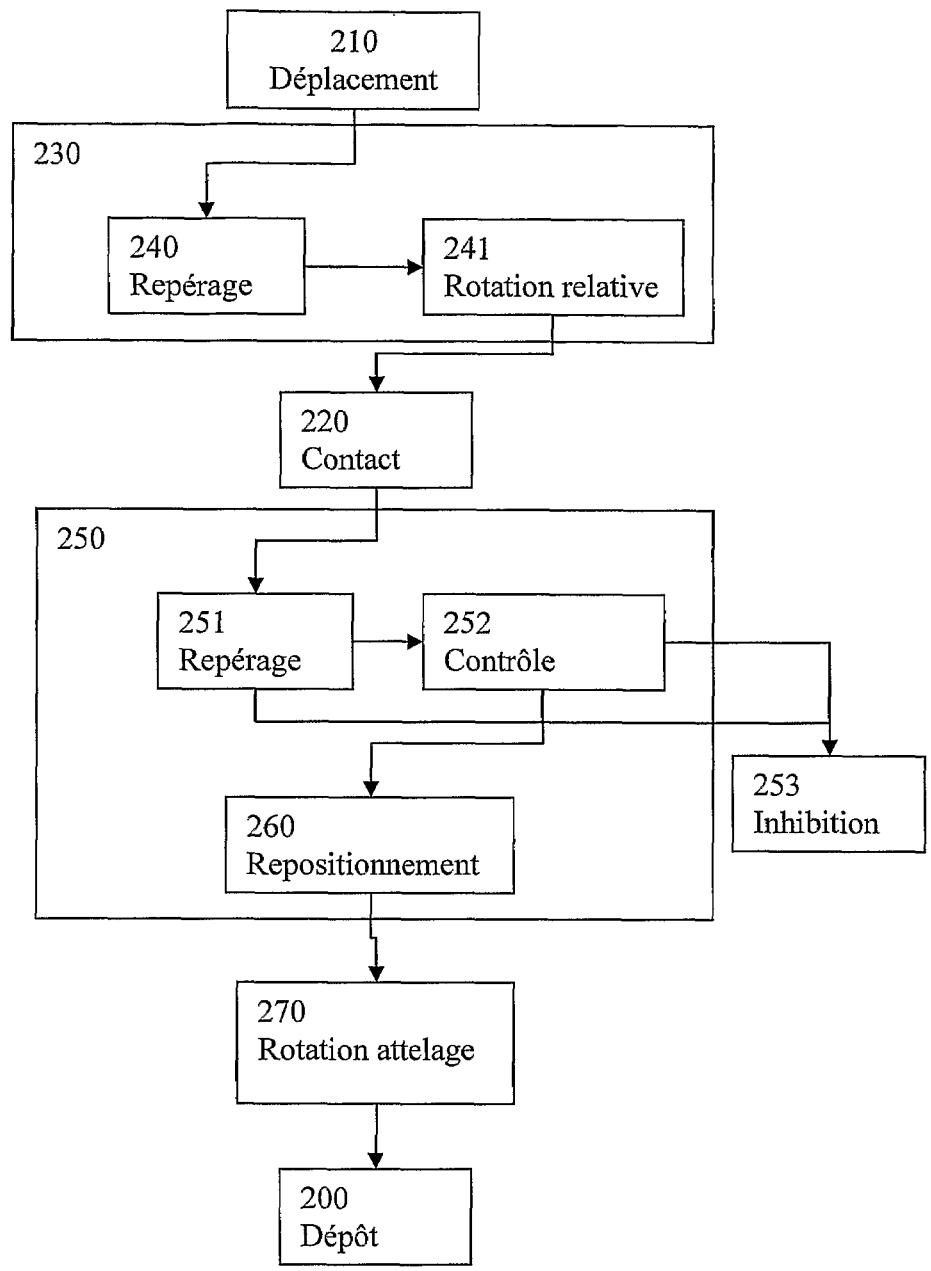
FIG. 2 is a schematic representation of an embodiment of the method according to the invention.

As schematically represented in FIG. 2, the method comprises the steps of carrying out a movement 210 of each object until ensuring it is in contact 220 with the holding device; and selectively carrying out a relative rotation 241 of the object and of the holding device about first and second axes of rotation to achieve said setting position.

The movement is provided, for example, by the conveyor means and the pincers/articulated movable arm described above.

The method according to the invention comprises a preparation step 230, applied for each object being loaded, and prior to its contact with the holding device.

This preparation step comprises a location operation 240 of generating an output signal representative of the relative angular position of the first and second locators, and an operation of angular correction 241 consisting in carrying out said relative rotation according to said output signal.

Thanks to the angular correction prior to the contact between the object and the holding device, the movement of each object comprises a translation movement between the object and the holding device, to achieve the setting position, the translation movement being subsequent to this angular correction operation.

In one embodiment, the generation of the output signal comprises the following steps consisting of taking 240, by optical means, a picture of the object. The picture obtained is then processed to locate a feature of the object having an optical signature, and, based on the located feature, the angular position of the object relative to said optical means is computed. Preferably, the optical means comprises at least one camera.

The accuracy obtained with a digital camera of sufficient resolution, for example 1280×1024 pixels is more or less 0.5° and the total time for acquiring the picture, digitization and computing the angle lies between 50 and 100 milliseconds.

In this way, a first level of processing the picture is achieved, for example by an unrolling of the bottom if the object is of the cylindrical type (for example a bottle), and a geometric feature of the object is located that has an optical signature. Typically, amongst the characteristic locators, the user will find a mechanical notch (R1 in FIG. 1), the symbol of the factory engraved on the bottom of the object or a mold number. The computerized process used may, for example, be a picture recognition process.

Preferably, the relative rotation is carried out by rotating the holding device about its axis of rotation.

In another embodiment, it is also possible to provide means for rotating the object, so that the relative rotary movement is carried out by a rotation of the object and a rotation of the holding device about their respective axis of rotation, in opposite directions. To achieve the setting position, each element rotates through an angle of less than 90°, which makes it possible to increase the average speed of achieving the setting position.

Irrespective of how it is achieved, the relative rotation is selective in the sense that, if by chance, the object and the holding device are in a relative position such that it has no need to be corrected, the relative rotation may not be carried out.

The absolute angular position of the holding device is known, so the position which the locator of the object must reach after the angular correction of the first level of processing is known. Once the angular correction has been selectively carried out, the method also comprises a rotation operation 270 of the coupling consisting of at least the object and the holding device fixedly attached together, to reach a determined initial angular position, a function of a decoration element to be placed on the object, and an operation of placement 200 of at least one decoration element on the object based on the determined initial angular position.

This rotation of the coupling makes it possible to present the object in a determined position, a function of the decoration to be placed, appropriate for an operation of placement of at least one decoration element on the object.

The method thus described applies both to an object without any decoration element and an object comprising a decoration element.

If the object comprises a decoration element, the noteworthy optical element that is the first locator may be either a locator of the object, as seen above, or an element of the decoration itself having an optical signature.

However, a number of variations may occasionally occur and very slightly offset the positioning of the decoration. Or else, the specifications of the decoration require an extremely precise setting.

The method for setting according to the invention may therefore advantageously be supplemented by a second processing level 250, a second adjustment and inspection step.

In one embodiment, the object has no decoration element. This second processing level 250 then comprises the steps 251 of taking, by optical means, a picture of the object docked on the holding device.

The picture obtained is processed to locate a feature of the object having an optical signature. Based on the located feature, the real angular position of the object relative to that which is expected after the angular correction operation (241) is computed and an output signal representative of the value of the angle thus computed is generated in order to, as a function of the value of the real angular position, reposition 260 the coupling, and continue 200 the following operations of placing decoration elements.

The means used for this step process only a small zone but with great precision. This inspection of the first level of setting and repositioning the coupling makes it possible to carry out a calibration function.

In another embodiment, the object comprises a decoration element. The second level of processing 250 then comprises the steps 251 of taking, by optical means, a picture of the object, and the picture obtained is processed to locate a feature of the decoration having an optical signature. Based on the located feature, the real angular position of the decoration element relative to that which is expected after the angular correction operation (241) is computed, and an output signal representative of the value of the angle thus computed is generated in order to, as a function of the value of the real angular position, reposition 260 the coupling, and continue 200, or disable 253, the following operations of placing decoration elements.

In a particular embodiment, one or more cameras situated above the setting station take a picture of the object comprising the element whose setting it is desired to verify.

The same picture processing as for the setting (picture recognition), or, as an alternative, a processing of the gradient computation time, is carried out, which makes it possible to locate a border of decoration or of relief on the object.

The angular position of the object and of a decoration element such as a reserve, or a glass pattern, or else a glass feature such as the mold joint, is then computed.

It is also possible by the same means to access the axial position of a decoration element.

The value of the angle and/or of the axial translation thus determined is sent to correction means so as to carry out a fine resetting 260. Also, if the position of the decoration does not conform to a predetermined value, the inspection means may send a signal triggering the disabling 253 of the subsequent screen-printing operations.

In the case of the axial locating of the position of the decoration, it is also possible to send a quantified signal making it possible to carry out a mechanical resetting, or to disable the subsequent operations if a nonconformity is thus detected.

It is therefore possible, by conventional picture processing and a matrix array camera fitted with an optical lens of appropriate focal length, for example, to measure an angular offset to within 0.2°, or to access an axial offset of a pattern with an accuracy better than a tenth of a millimeter.

Thanks to this accuracy, in one embodiment, it is possible to block the screen-printing of a nonconforming object because a decoration element would be excessively offset.

The invention claimed is:

1. A method for automatic and sequential loading of objects of a predetermined type onto a holding device of a decorating machine, each said object and the holding device having first and second respective axes of rotation and first and second respective locators of rotation about said respective axes, the loading of each said object onto the holding device leading to a contact of each said object with the holding device, to an alignment of the first and second axes, said method comprising the steps of:

carrying out a movement of each said object until each said object is in contact with the holding device;

selectively carrying out a relative rotation of each said object and the holding device about the first and second axes of rotation to achieve said setting position;

and for each said object being loaded, prior to contact with the holding device: performing a preparation step comprising performing a location operation including generating an output signal representative of a relative angular position of the first and second locators; and performing an angular correction operation including carrying out said relative rotation according to said output signal, the loading of each said object onto the holding device leading to an angular setting of the first and second locators in a predetermined relative angular position, and the method further comprising an operation of rotation, in a determined angular position, of the coupling consisting of the object and the holding device fixedly attached to one another.

2. The loading method as claimed in claim 1, wherein the output signal generating step comprises:

taking, by optical means, a picture of the respective object;

carrying out a processing of the picture obtained to locate a feature of the respective object or of a decoration element having an optical signature; and computing, based on the located feature, the angular position of the respective object relative to said optical means.

3. The loading method as claimed in claim 1, wherein the relative rotation carrying out step is carried out by rotating the holding device about an axis of rotation.

4. The loading method as claimed in claim 1, wherein an absolute angular position of the holding device being known, the method further comprises:
  performing an operation of rotation of a coupling comprising at least a respective object and the holding device fixedly attached to reach a determined initial angular position as a function of a decoration element to be placed on the respective object; and
  performing an operation of placement of at least one decoration element on the respective object based on the determined initial angular position.

5. The loading method as claimed in claim 4, further comprising performing an adjustment and inspection operation.

6. The loading method as claimed in claim 5, wherein the adjustment and inspection operation performing step comprises:
  taking, by optical means, a picture of the respective object;
  carrying out a processing of the picture obtained to locate a feature of the respective object or of the decoration having an optical signature;
  computing, based on the located feature, the real angular position of the respective object or of the decoration element relative to that which is expected after the angular correction operation; and
  generating an output signal representative of a value of an angle thus computed in order to, as a function of a value of the real angular position, reposition the coupling, and continue or disable the operations of placing decoration elements.

7. The loading method as claimed in claim 2, wherein the picture of the object is taken when the object is still on a feed conveyor of the screen-printing machine.

8. The loading method of claim 1, further comprising:
  forming the holding device to comprise at least one skirt furnished with a retractable pin designed to be positioned in a notch on the bottom of the object, and the pin forming a locator of rotation of the holding device.

9. The loading method of claim 1, further comprising:
  communicating the angular position of the object to a robot which commands the placing in rotation by an electric motor of the skirt so that the docking and positioning of the pin is carried out by only one translation movement that is subsequent to an angular correction operation.

10. The loading method of claim 1, further comprising placing at least one decoration element on the object and rotating the object and the holding device fixedly attached as a function of the at least one decoration element being placed on the object.

11. The loading method of claim 1, wherein the decorating machine is a screen-printing, pad-printing inkjet and the method further comprises loading the object onto the holding device of said screen-printing, pad-printing inkjet.

12. The loading method of claim 11, further comprising providing an object having any shape.

13. An item of equipment for the automatic and sequential loading of objects of a predetermined type onto a holding device of a decorating machine, each said object and the holding device having respective first and second axes of rotation and respective first and second locators of rotation about said respective axes, the loading of each said object onto the holding device leading to a contact of each said object with the holding device, to an alignment of the first and second axes, and to an angular setting of the first and second locators in a predetermined relative angular position, said item of equipment comprising:
  said holding device;
  means for moving each said object and for ensuring each said object is in contact with the holding device;
  means for selectively carrying out a relative rotation of a respective object and of the holding device about first and second axes of rotation and for achieving said setting position;
  at least one locating means configured to generate an output signal representative of the relative angular position of the first and second locators;
  angular correction means configured to carry out said relative rotation as a function of said output signal prior to contact with the holding device; and
means for rotating, in a determined angular position, of the coupling consisting of the object and the holding device fixedly attached to one another,
  wherein the holding device comprises at least one skirt furnished with a retractable pin designed to be positioned in a notch on the bottom of the object, the pin forming a locator of rotation of the holding device.

14. The item of equipment as claimed in claim 13, further comprising a robot which commands the placing in rotation, by an electric motor, of the skirt so that the docking and positioning of the pin is carried out by only one translation movement that is subsequent to an angular correction operation and means for communicating the angular position of the object to the robot.

15. The item of equipment as claimed in claim 13, further comprising means for placing at least one decoration element on the object and means for rotating the object and the holding device fixedly attached as a function of the at least one decoration element to be placed on the object.

16. The item of equipment as claimed in claim 13, wherein the decorating machine is a screen-printing, pad-printing, inkjet and wherein the object can be of any shape.

17. The item of equipment as claimed in claim 13, further comprising inspection means configured to generate an output signal representative of the conformity of a setting of the respective object or of the positioning of a decoration element.

18. The item of equipment as claimed in claim 17, wherein the locating and/or inspection means are optical means and comprise at least one camera.

* * * * *